(12) United States Patent
Averitt

(10) Patent No.: US 7,719,411 B2
(45) Date of Patent: May 18, 2010

(54) METHOD AND SYSTEM OF TRANSMITTING A PLURALITY OF MOVEMENT PARAMETERS OF A VEHICLE VIA A TWO-WIRE INTERFACE

(75) Inventor: Scott Averitt, Roseville, MI (US)

(73) Assignee: Robert Bosch GmbH (DE)

( * ) Notice: Subject to any disclaimer, the term of this patent is extended or adjusted under 35 U.S.C. 154(b) by 291 days.

(21) Appl. No.: 11/811,731

(22) Filed: Jun. 12, 2007

(65) Prior Publication Data

US 2008/0309476 A1   Dec. 18, 2008

(51) Int. Cl.
 *B60Q 1/00* (2006.01)
(52) U.S. Cl. .................... 340/439; 340/441; 342/207.2
(58) Field of Classification Search ................ 340/441, 340/439; 324/207.2, 207.21–207.25
See application file for complete search history.

(56) References Cited

U.S. PATENT DOCUMENTS

| | | | |
|---|---|---|---|
| 4,583,220 A * | 4/1986 | Blackburn et al. | 370/295 |
| 5,343,470 A * | 8/1994 | Hideshima et al. | 370/462 |
| 5,473,725 A | 12/1995 | Chen et al. | |
| 5,563,980 A | 10/1996 | Chen et al. | |
| 5,644,288 A * | 7/1997 | Kuroyanagi | 340/441 |
| 5,880,586 A * | 3/1999 | Dukart et al. | 324/207.2 |
| 5,929,588 A | 7/1999 | Shiah | |
| 6,118,260 A | 9/2000 | Kirkpatrick, II et al. | |
| 6,437,581 B1 | 8/2002 | Blossfeld | |
| 6,560,279 B1 | 5/2003 | Renz | |
| 6,629,251 B1 * | 9/2003 | Anderson et al. | 713/401 |
| 6,717,416 B2 | 4/2004 | Koernle et al. | |
| 6,776,058 B1 | 8/2004 | Schroeder | |
| 6,874,750 B2 | 4/2005 | Muraji | |
| 7,170,280 B2 * | 1/2007 | Lohberg | 324/207.25 |
| 7,613,560 B2 * | 11/2009 | Nishi et al. | 701/93 |
| 2003/0184447 A1 | 10/2003 | Otterbach et al. | |
| 2006/0091879 A1 | 5/2006 | Hara | |
| 2007/0124144 A1 * | 5/2007 | Johnson | 704/246 |

* cited by examiner

*Primary Examiner*—Jennifer Mehmood
(74) *Attorney, Agent, or Firm*—Michael Best & Friedrich LLP

(57) ABSTRACT

A system of transmitting a plurality of movement parameters of a vehicle. The system includes a supply terminal, a plurality of sensing elements, a modulation circuit, and a return terminal. The supply terminal is coupled to a power source to receive power. The sensing elements receive power from the supply terminal. Each of the sensing elements senses a movement characteristic of the vehicle, and generates movement signals indicative of the sensed movement characteristic. The modulation circuit is coupled to the sensing elements to modulate the movement signals based on the plurality of sensing elements. The return terminal is coupled to the modulation circuit to output the modulated movement signals.

21 Claims, 4 Drawing Sheets

| | SPEED OUTPUT | DIRECTION OUTPUT | |
|---|---|---|---|
| 1 | INACTIVE | INACTIVE | 304 |
| 2 | INACTIVE | ACTIVE | 308 |
| 3 | ACTIVE | INACTIVE | 312 |
| 4 | ACTIVE | ACTIVE | 316 |

300

METHOD AND SYSTEM OF TRANSMITTING A PLURALITY OF MOVEMENT PARAMETERS OF A VEHICLE VIA A TWO-WIRE INTERFACE

BACKGROUND

Embodiments of the invention relate to sensing systems, particularly, to sensing systems having a 2-wire interface.

One type of sensing system in a vehicle uses Hall effect sensors to measure rotational velocities exhibited by electric motors. Hall effect sensors are typically placed near ring magnets of the motors to measure rotation velocities. When a motor armature rotates, poles (North and South) of ring magnets pass by the Hall effect sensors. In turn, rates at which the poles pass by the Hall effect sensors are measured.

Ring magnets often have a fixed number of magnetic poles that is generally predetermined when motors are constructed. Different motors have different ring magnets, and thus a different number of magnetic poles. As such, knowing the number of magnetic poles can assist in determining motor speeds, for example, by measuring times between output pulses generated by the Hall effect sensors.

In some instances, motors have two Hall effect sensors positioned to measure information such as direction and speed of the motor. For example, Hall effect sensors are placed near ring magnets such that outputs of the Hall effect sensors are phased 90 degrees apart. Placing Hall effect sensors 90 degrees apart allows one of the Hall sensors to sense information such as the speed of the motor, and the other Hall sensor to sense other information such as direction of the motor. The physical location of the Hall effect sensors provide an indication of an order of the output pulses, which in turn provides an indication of the direction of the motor.

Some motor sensing implementations use a sensor that incorporates two Hall effect sensors in a single package. These sensors typically have two outputs. One of the outputs is a pulse train that indicates a speed of the motor, while the other output indicates a rotational direction of the motor. For example, a high output voltage can indicate a clockwise rotation, and a low output voltage can indicate a counter-clockwise rotation of the motor. Outputs such as speed and direction of motors are subsequently communicated through some electrical wire connection interface to an electronic control unit for further processing. Some implementations use four-wire connections. In such cases, the first of the four-wire connections supplies a voltage to both Hall sensors; the second of the four-wire connections provides a ground for both Hall sensors; the third of the four-wire connections provides an output for speed information; and, the fourth of the four-wire connections provides an output for directional information. Other implementations use a three-wire connection interface. In such cases, one of the three-wire connections provides a ground for both Hall effect sensors, another connection acts both as an output for speed information and as a voltage supply for both Hall effect sensors, and the third connection acts as an output for directional information and as a voltage supply for both Hall effect sensors.

SUMMARY

Although 4 wire sensing systems are functional, multiple-wire configurations are less than ideal and using multiple wires often leads to increased cost and weight. Thus it would be beneficial to have a sensing system that can function with a two-wire interface and still provide both speed and direction information to an electronic control unit.

In one embodiment, the invention provides a system of transmitting a plurality of movement parameters of a vehicle. The system includes a supply terminal, a plurality of sensing elements, a multiplexing or multiplex circuit, and a return terminal. The supply terminal is coupled to a power source to receive power. The sensing elements receive power from the supply terminal. Each of the sensing elements senses a movement characteristic of the vehicle, and generates movement signals indicative of the sensed movement characteristic. The multiplex circuit is coupled to the sensing elements to multiplex the movement signals based on the plurality of sensing elements onto the supply terminal. The second terminal output supplies the ground return.

In another embodiment, the invention provides a method for transmitting a plurality of movement parameters of a vehicle. The method includes supplying power to a supply terminal, and sensing a plurality of movement characteristics of the vehicle at a plurality of sensing elements coupled to the supply terminal. The method also includes generating movement signals indicative of the sensed movement characteristics, multiplexing the movement signals based on the plurality of sensing elements, and outputting the multiplexed movement signals through a return terminal.

In yet another embodiment, the invention provides a two-wire sensor that includes a first terminal, a first sensing element, a second sensing element, a multiplex circuit, and a second terminal. The first terminal is coupled to a power source to receive power from the power source. The first sensing element is coupled to the first terminal to receive power, and to sense a first characteristic and generates a first signal indicative of the first characteristic. The second sensing element is coupled to the first terminal to receive power, and senses a second characteristic and to generate a second signal indicative of the second characteristic. The multiplex circuit combines at least one of the first and second sensing elements into a multiplexed signal. The second terminal output supplies the ground return.

Other aspects of embodiments of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Embodiments of the invention provides a method and a system for transmitting rotational speed and direction information via a 2-wire interface. In one particular embodiment, the system includes two terminals that act as power inputs, a sensed signal output, and a signal return.

Figure 1:
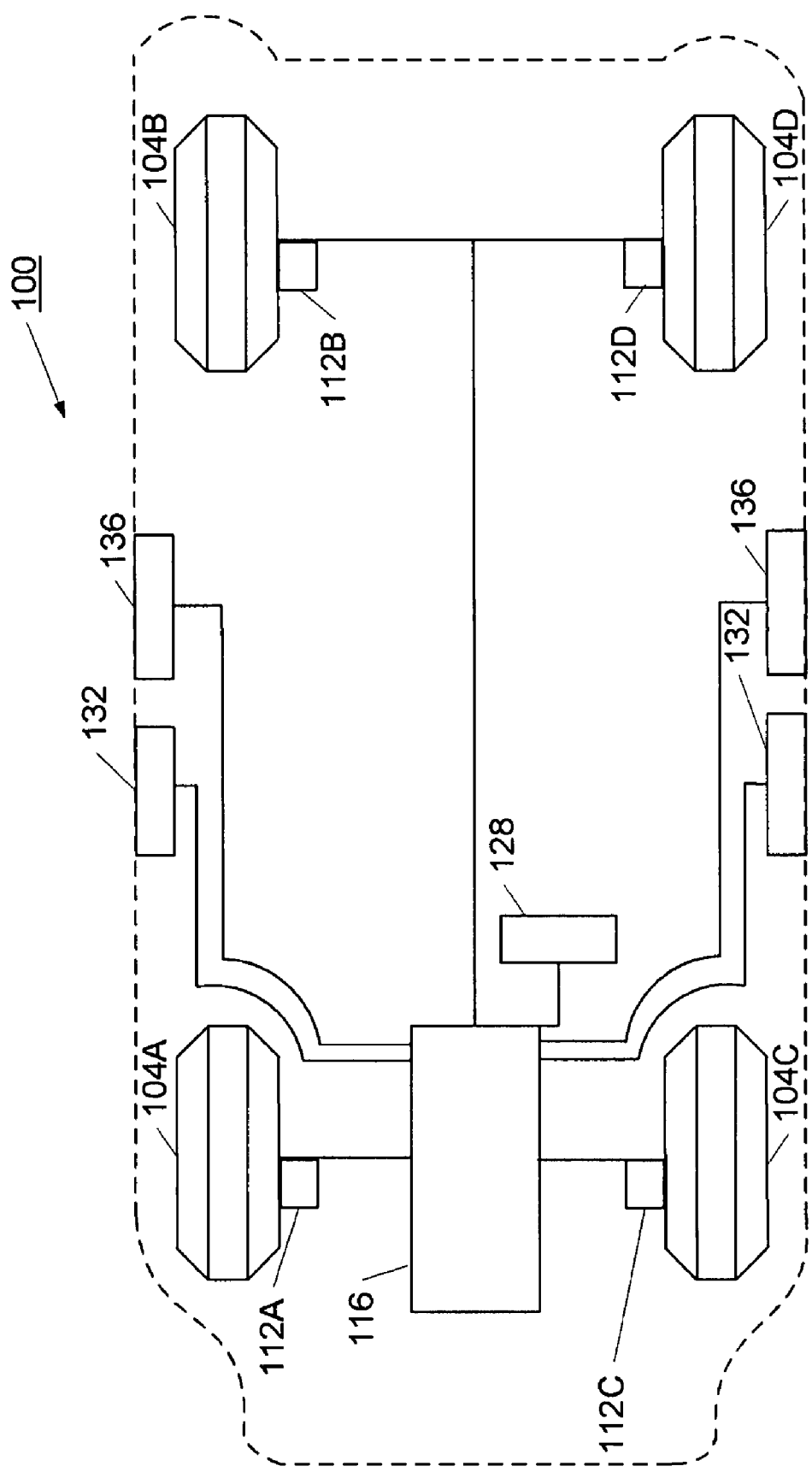
FIG. 1 shows a schematic plan view of an exemplary vehicle.

FIG. 1 shows a schematic plan view of an exemplary vehicle 100. The vehicle 100 has four wheels 104A, 104B, 104C, and 104D. The wheels 104A, 104B, 104C, and 104D are monitored by a plurality of wheel sensors 112A, 112B, 112C, and 112D. The wheel sensors 112A, 112B, 112C, and 112D are coupled to an electronic processing unit ("ECU") 116. The vehicle 100 also includes other sensors such as a steering wheel sensor 128, a plurality of front window sensors 132, and a plurality of rear window sensors 136. The wheel sensors 112A, 112B, 112C, and 112D, the steering wheel sensor 128, the front window sensors 132, and the rear window sensors 136 are shown as individual sensors generically. These sensors 112A, 112B, 112C, 112D, 128, 132, and 136 can also include multiple sensors in a plurality of sensor arrays that may be coupled to the ECU 116. Although FIG. 1 shows only the sensors 112A, 112B, 112C, 112D, 128, 132, and 136, other types of sensors such as seat-adjuster sensor, restraint device sensors, sunroof sensors, power sliding doors, power tailgate, and windshield wiper sensors can also be used in the vehicle 100.

In the embodiment shown, the sensors 132 are included in a motor for driving a window (not shown) of the vehicle 100. The sensors 132 are typically Hall effect sensors. In such cases, the sensors 132 detect and monitor a plurality of specific conditions of the window motor. For example, the sensors 132 are used to sense conditions of the window that are indicative of an amount of traveling velocity and a position of the window. Sensed conditions are then transduced and converted into signals that are indicative of the amount of traveling velocity and position of the window. Of course, the vehicle 100 may include other motors that have sensors. Examples of such motors include seat-adjusters, restraint devices, sunroofs, power sliding doors, power tailgate, and windshield wipers.

Figures 2, 3:
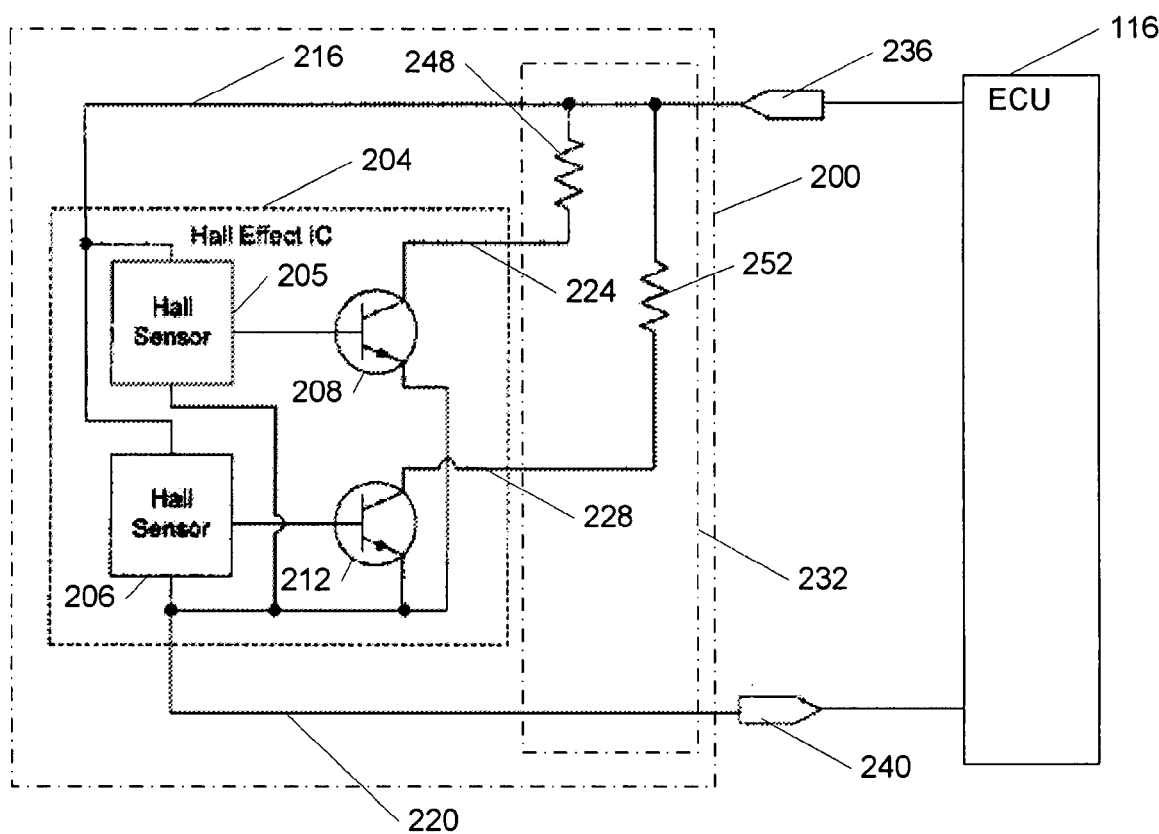
FIG. 2 shows an exemplary two-wire sensing system.
FIG. 3 shows an output table for the two-wire sensing system of FIG. 2.

FIG. 2 shows an exemplary two-wire sensing system 200 that can be implemented in conjunction with a motor (not shown) such as the window driving motor in the vehicle 100 of FIG. 1. Although the two-wire sensing system 200 is shown directly coupled to the ECU 116 of FIG. 1, the two-wire sensing system 200 can also be coupled to the ECU 116 via other circuits in other embodiments, detailed hereinafter. In the embodiment shown, the two-wire sensing system 200 includes a sensor package 204 that incorporates therein a plurality of sensors 205, 206 (in this instance, the sensors 132 of FIG. 1). An example of the sensor package 204 is an Infineon TLE4966H integrated circuit or an Infineon TLE4966L integrated circuit. In other embodiments, however, the two-wire sensing system 200 includes individual circuit components such as such as a plurality of individual Hall effect sensors and switches, rather than a prepackaged sensor package.

The sensor package 204 also includes first and second transistors or switches 208 and 212. In the embodiment shown, the sensor package 204 has a power supply pin 216, a ground pin 220, a first switch pin 224, and a second switch pin 228. After the sensor package 204 has been powered through the power supply pin 216 and the ground pin 220, and when the motor starts to rotate, the sensors 205, 206 are activated to sense a plurality of movement conditions or characteristics of the motor, such as speed, rotational direction, and proximity. The sensors 205, 206 then generate a plurality of outputs based on the sensed conditions. In some embodiments, the outputs from the sensors 205, 206 are in the form of pulses. In such cases, the output pulses generally represent the sensed conditions of the motor. For example, measuring a time between the output pulses yields a speed of the motor. For another example, measuring an order of the pulses yields a rotational direction of the motor. In the embodiment shown, the sensor 205 is a speed sensor that senses a speed of the motor, and the sensor 206 is a rotational direction sensor that senses a rotational direction of the motor.

In the embodiment shown, the power supply pin 216, the ground pin 220, the first switch pin 224, and the second switch pin 228 are coupled to an interface module 232 to modulate or multiplex the outputs of the sensors 205, 206. The interface module 232 includes first and second terminals 236, 240. The first terminal 236 is generally considered a supply terminal for the two-wire sensing system 200, and is connected to a power supply (not shown). The second terminal is generally considered a ground or return terminal, which also acts as an output terminal for the two-wire sensing system 200. Similarly the first terminal 236 can also act as an output terminal for the two-wire sensing system 200.

The interface module 232 generally includes a plurality of current sources 248, 252 to draw different amounts of current from the first terminal 236 to the switches 208, 212. Particularly, depending on the output of the sensors 205, 206, different amounts of current are drawn to signify a type of output generated by the sensors 205, 206, detailed hereinafter. In the embodiment shown, the current sources 248, 252 are in the form of first and second resistors, respectively. Depending on the sensors 205, 206, different resistor values are used for the respective outputs from the speed sensor 205 and the directional sensor 206. In this way, different amounts of current can be drawn from the first terminal 236 depending on which of the outputs is active. In the embodiment shown with the sensor package 204, the first current source resistor 248 has a value of 249Ω, and the second current source resistor 252 has a value of 511Ω.

As the motor rotates in a direction at a speed, the sensors 205, 206 are selectively activated to generate a plurality of active outputs signals. When the sensors 205, 206 are selectively generating the outputs, the outputs in turn activates the switches 208 and 212. Due to the different resistive values of the first and second current source resistors 248, 252, different amounts of currents are drawn from the first terminal 236, and appear at the second terminal 240. FIG. 3 shows a table 300 indicating all possible combinations of active and inactive sensors 205, 206. Since there are two sensors 205, 206, there are four possible states. For example, a first state 304 indicates both of the sensors 205, 206 are inactive. A second state 308 indicates only the directional sensor 206 is active. A third state 312 indicates only the speed sensor 205 is active. A fourth state 316 indicates both of the sensors 205, 206 are active.

Figure 4:
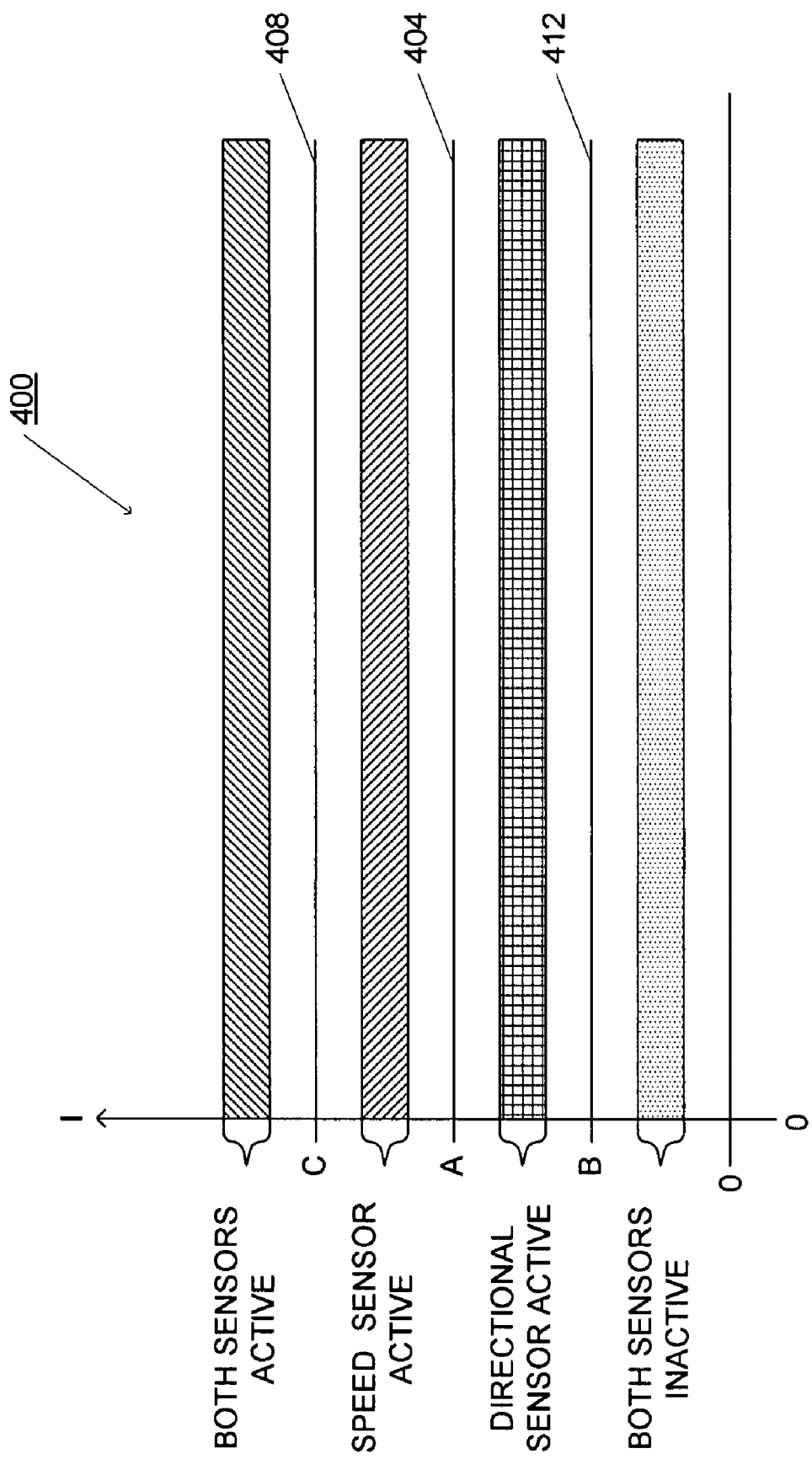
FIG. 4 shows an exemplary output current plot for the two-wire sensing system of FIG. 2.

FIG. 4 shows an exemplary output current level plot 400 for the two-wire sensing system 200 of FIG. 2. As discussed earlier, the resistor values of the resistors 248, 252 are chosen such that the four different states 304, 308, 312, 316 as shown in FIG. 3 have non-overlapping current boundaries based on circuit element tolerances. In this way, the ECU 116 of FIG. 1 can accurately demodulate or de-multiplex the outputs.

In the embodiment shown in FIG. 2, the output generated by the speed sensor 205 is configured to draw more current than the output generated by the direction sensor 206. In this way, outputs having a relatively high current level can be directly interpreted by the ECU 116 without knowing if the directional sensor 206 is active or inactive. As such, a single threshold can be set between a maximum current value generated by only the directional sensor 206 and a minimum current value generated by only the speed sensor 205. In the embodiment shown in FIG. 2, an exemplary level 404 positioned between a maximum current value generated by only the directional sensor 206 and a minimum current value generated by only the speed sensor 205 is shown as threshold A in FIG. 4. Accordingly, the ECU 116 will recognize that a speed of the motor is available when the current level of the output pulses is above threshold A or level 404. Moreover, since speed is often required in processing decisions, having a threshold such as level 404 allows information regarding the speed of the motor to be communicated to and processed by the ECU 116 directly and with minimum or no delay.

As for the outputs generated by the directional sensor 206, two levels or thresholds are used to differentiate between inactive and active states. For example, a second level 408 (threshold B) can be positioned between a maximum current value generated by only the speed sensor 205, and a minimum current value generated by both the speed sensor 205 and the directional sensor 206. In other embodiments, the level 408 can also be positioned above the maximum current value generated by only the speed sensor 205. Similarly, a third level 412 (threshold C) can be positioned between a maximum current value that can be generated by both inactive sensors 205, 206, and a minimum current value generated by only an active directional sensor 206. In some embodiments, the level 412 can also be positioned just above the maximum current value that can be generated by both inactive sensors 205, 206. Once the ECU 116 has determined that the current level of the output is above level 208, the ECU 116 recognizes that the directional sensor 206 is active. For example, if an inactive directional sensor 206 indicates a counter-clockwise rotation, the motor is rotating clockwise when the current value of the output is above level 208.

Figure 5:
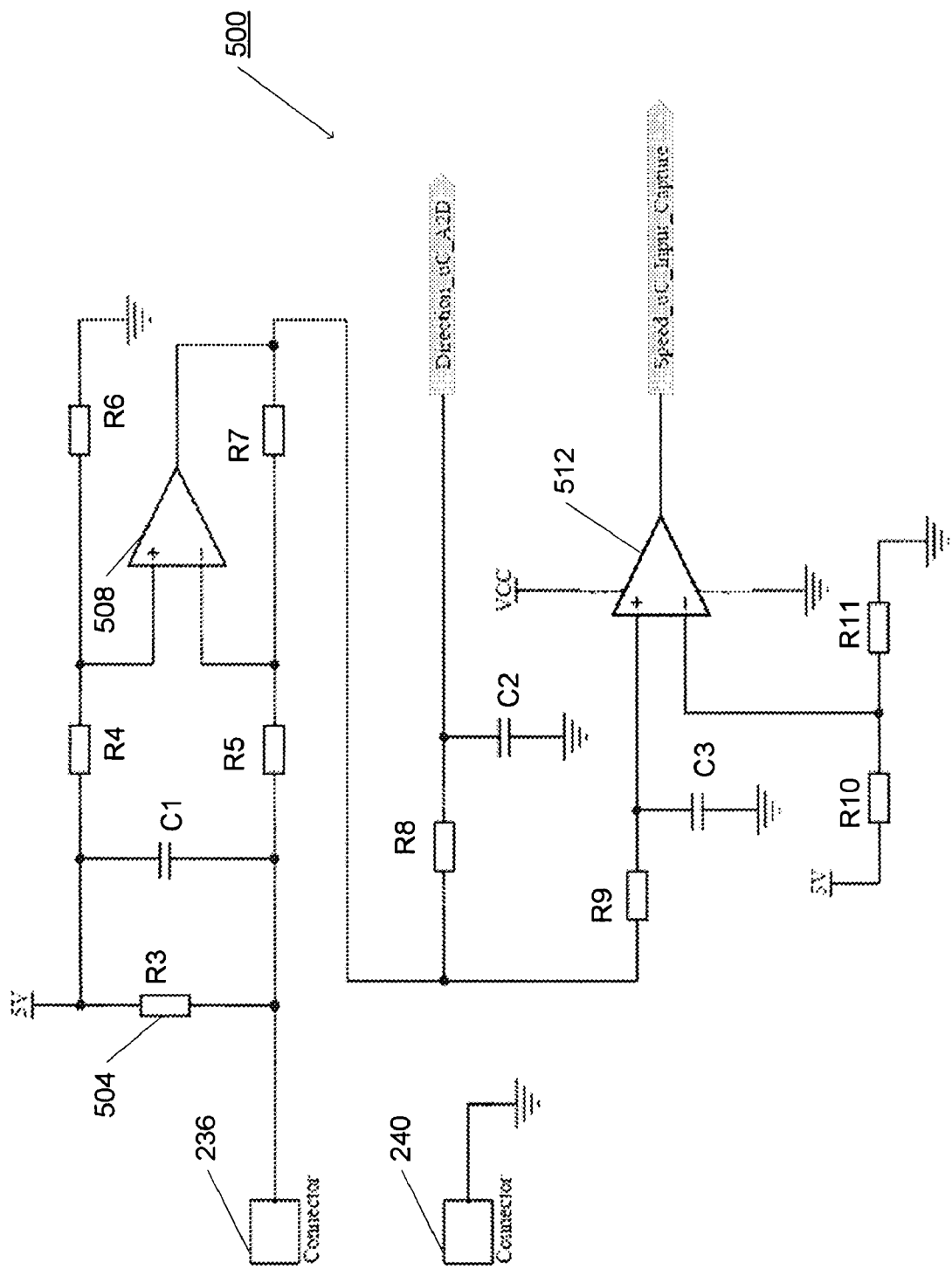
FIG. 5 shows an exemplary receiver, demodulator, or de-multiplexer of the 2-wire sensing system.

Although the ECU 116 can de-multiplex the outputs generated by the 2-wire sensing system 200 of FIG. 2, other optional circuits can also be used to receive the outputs. FIG. 5 shows an exemplary embodiment of a receiver, demodulator, or de-multiplexer 500 that receives and demodulates or de-multiplexes the outputs of the 2-wire sensing system 200 of FIG. 2. In the embodiment shown, a third resistor 504 is connected in series with the first terminal 236 to sense a change in the amount of current drawn from the 2-wire sensing system 200. The third resistor 504 is sized such that current drawn by the third resistor does not reduce the output voltage between terminals 236 and 240 below the minimum operating voltage required by the sensing system 200 when the maximum amount of current is drawn by the sensing system 200. In other embodiments, the third resistor 504 is connected in series with the second terminal 240 to sense a change in the amount of current drawn from the 2-wire sensing system 200. Furthermore, the outputs from the 2-wire sensing system 200 are amplified in an amplifier section 508 based on applications and components selected for the 2-wire sensing system 200. In some embodiments, the amplifier section 508 includes an LM2904 operational amplifier.

After the outputs have been amplified by the amplifier section 508, the amplified outputs are optionally demodulated or de-multiplexed with a comparator section 512. As discussed earlier, the speed information from the speed sensor 205 can be readily determined by comparing the current level of the outputs with the threshold A or the level 404. The comparator 512, as shown in FIG. 5, compares the current level of the outputs with a fixed current amount indicative of the threshold A. In some embodiments, the comparator 512 includes an LM2904 operational amplifier. Also as discussed earlier, the directional information can be readily extracted from the amplified outputs by the ECU 116 depending on the current level of the outputs. Optionally, the direction information can be determined with a comparator (not shown) that has an adjustable threshold based on the output of the speed sensor 205. In some embodiments, the directional information from the directional sensor 206 is an analog signal.

Various features and advantages of the invention are set forth in the following claims.

What is claimed is:

1. A system of transmitting a plurality of movement parameters of a vehicle, the system comprising:
   a supply terminal coupled to a power source, and configured to receive power;
   a plurality of sensing elements configured to receive power from the supply terminal, each of the sensing elements configured to sense a movement characteristic of the vehicle, and generate movement signals indicative of the sensed movement characteristic;
   a multiplex circuit coupled to the sensing elements, and configured to multiplex the movement signals based on the plurality of sensing elements to create a multiplexed signal, wherein the multiplexed signal is configured to be decoded into one of at least four amplitude states including, a first state, wherein a first and second sensor of the plurality of sensors both indicate logic low; a second state, wherein the first sensor indicates logic low and the second sensor indicates logic high; a third state, wherein the first sensor indicates logic high and the second sensor indicates logic low; and a fourth state, wherein the first and second sensors both indicate logic high; and
   a return terminal coupled to the multiplex circuit, and configured to output the multiplexed movement signals.

2. The system of claim 1, further comprising at least one of a switch and a transistor coupled to the multiplex circuit, and configured to be activated by the movement signals.

3. The system of claim 1, wherein the multiplex circuit comprises a plurality of current sources configured to draw different amounts of current from the supply terminal.

4. The system of claim 3, wherein at least one of the current sources comprises a resistor.

5. The system of claim 1, wherein the vehicle comprises a motor configured to rotate, and wherein the movement characteristic comprises a rotating characteristic of the motor.

6. The system of claim 5, wherein the rotating characteristic comprises a speed and a rotational direction of the motor.

7. The system of claim 1, wherein at least one of the sensing elements comprises a Hall effect sensor.

8. A method for transmitting a plurality of movement parameters of a vehicle, the method comprising:
   supplying power to a supply terminal;
   sensing a plurality of movement characteristics of the vehicle at a plurality of sensing elements coupled to the supply terminal;
   generating movement signals indicative of the sensed movement characteristics;
   modulating the movement signals based on the plurality of sensing elements to create a modulated signal, wherein the modulated signal is configured to be decoded into one of at least four amplitude states including, a first state, wherein a first and second sensor of the plurality of sensors both indicate logic low; a second state, wherein the first sensor indicates logic low and the second sensor indicates logic high; a third state, wherein the first sensor indicates logic high and the second sensor indicates logic low; and a fourth state, wherein the first and second sensors both indicate logic high; and
   outputting the modulated movement signals through a return terminal.

9. The method of claim 8, wherein the vehicle comprises a motor, wherein sensing a plurality of movement characteristics comprises:
  activating the motor; and
  sensing a plurality of rotating characteristics of the activated motor.

10. The method of claim 9, wherein sensing a plurality of rotating characteristics of the activated motor comprises sensing a speed and a rotational direction of the activated motor.

11. The method of claim 8, further comprising selectively activating at least one of a switch and a transistor when the sensing elements are selectively activated.

12. The method of claim 8, wherein multiplexing the movement signals comprises drawing different amounts of current from the supply terminal when the sensing elements are selectively activated.

13. The method of claim 8, wherein multiplexing the movement signals comprises drawing different amounts of current with a resistor.

14. The method of claim 8, wherein sensing a plurality of movement characteristics of the vehicle at a plurality of sensing elements comprises sensing a plurality of movement characteristics with two Hall effect sensors.

15. A two-wire sensor comprising:
  a first terminal configured to be coupled to a power source, and to receive power from the power source;
  a first sensing element coupled to the first terminal to receive power, and configured to sense a first characteristic and to generate a first signal indicative of the first characteristic;
  a second sensing element coupled to the first terminal to receive power, and configured to sense a second characteristic and to generate a second signal indicative of the second characteristic;
  a modulation circuit configured to selectively multiplex at least one of the first and second sensing elements into a multiplexed signal, wherein the multiplexed signal has a frequency substantially equal to a frequency of at least one of the first signal and the second signal; and wherein the modulated signal is configured to be decoded into one of at least four amplitude states, including, a first state, wherein a first and second sensor of the plurality of sensors both indicate logic low; a second state, wherein the first sensor indicates logic low and the second sensor indicates logic high; a third state, wherein the first sensor indicates logic high and the second sensor indicates logic low; and a fourth state, wherein the first and second sensors both indicate logic high; and
  a second terminal to output the multiplexed signal.

16. The sensor of claim 15, further comprising at least one of a switch and a transistor coupled to the multiplex circuit, and configured to be activated by the first and second signals.

17. The sensor of claim 15, wherein the multiplex circuit comprises a plurality of current sources configured to draw different amounts of current from the first terminal.

18. The sensor of claim 17, wherein at least one of the current sources comprises a resistor.

19. The sensor of claim 15, wherein the vehicle comprises a motor configured to rotate, and wherein the first and second characteristics comprise first and second rotating characteristic of a motor.

20. The sensor of claim 19, wherein the rotating characteristics comprise a speed and a rotational direction of the motor.

21. The sensor of claim 15, wherein at least one of the first and second sensing elements comprises a Hall effect sensor.

* * * * *